(12) United States Patent
Martin et al.

(10) Patent No.: US 9,479,835 B2
(45) Date of Patent: Oct. 25, 2016

(54) VIDEO-ON-DEMAND SYSTEM

(71) Applicant: Sony Corporation, Tokyo (JP)

(72) Inventors: Andreas Martin, Salzburg (AT);
Hans-Peter Foetschl, St. Michael (AT)

(*) Notice: Subject to any disclaimer, the term of this patent is extended or adjusted under 35 U.S.C. 154(b) by 0 days.

(21) Appl. No.: 14/451,538

(22) Filed: Aug. 5, 2014

(65) Prior Publication Data

US 2014/0344871 A1 Nov. 20, 2014

Related U.S. Application Data

(63) Continuation of application No. 12/303,663, filed as application No. PCT/EP2007/005014 on Jun. 6, 2007, now Pat. No. 8,839,320.

(30) Foreign Application Priority Data

Jun. 7, 2006 (EP) .................................. 06252937

(51) Int. Cl.
*H04N 7/173* (2011.01)
*H04N 21/472* (2011.01)
(Continued)

(52) U.S. Cl.
CPC .... *H04N 21/47202* (2013.01); *H04N 5/44513* (2013.01); *H04N 7/17336* (2013.01); *H04N 21/431* (2013.01); *H04N 21/4316* (2013.01); *H04N 21/47217* (2013.01); *H04N 21/6587* (2013.01); *H04N 21/812* (2013.01);
(Continued)

(58) Field of Classification Search
CPC .................... H04N 7/17318; H04N 7/17336; H04N 21/47202

USPC ............................ 725/86–104; 709/217–232
See application file for complete search history.

(56) References Cited

U.S. PATENT DOCUMENTS 6,229,532 B1* 5/2001 Fujii ................. G06F 17/30884
707/E17.114
6,637,029 B1 10/2003 Maissel et al.
(Continued)

FOREIGN PATENT DOCUMENTS

EP 0 872 987 10/1998
EP 1 389 777 2/2004
(Continued)

OTHER PUBLICATIONS

Office Action issued Oct. 20, 2015 in European Patent Application No. 06 252 937.5.

*Primary Examiner* — Annan Shang
(74) *Attorney, Agent, or Firm* — Oblon, McClelland, Maier & Neustadt, L.L.P.

(57) ABSTRACT

A video-on-demand system including a video server storing video-on-demand content and for streaming video-on-demand through a first layer of an internet page having a first layer and a second layer; and a controller for causing there to be formed in the second layer a plurality of selectable overlay images such that a user at a location in communication with the internet remote from the video server and the controller can display streamed video-on-demand of the first layer in combination with the overlay images of the second layer and can select one of the overlay images; wherein the overlay images correspond to respective control functions for the video-on-demand stream; and the controller is responsive to selection of an overlay image to change the video-on-demand stream in accordance with the corresponding respective control function.

11 Claims, 8 Drawing Sheets

(51) Int. Cl.
*H04N 5/445* (2011.01)
*H04N 21/431* (2011.01)
*H04N 21/6587* (2011.01)
*H04N 21/81* (2011.01)
*H04N 21/462* (2011.01)
*H04N 21/47* (2011.01)

(52) U.S. Cl.
CPC ...... *H04N21/8153* (2013.01); *H04N 21/8173* (2013.01); *H04N 21/4622* (2013.01); *H04N 21/47* (2013.01)

(56) References Cited

U.S. PATENT DOCUMENTS

| | | | |
|---|---|---|---|
| 7,529,259 | B2 | 5/2009 | Van Acker et al. |
| 7,559,034 | B1 | 7/2009 | Paperny et al. |
| 7,716,662 | B2* | 5/2010 | Seiden ............... G06F 8/61 717/173 |
| 7,899,915 | B2 | 3/2011 | Reisman |
| 8,122,014 | B2 | 2/2012 | Brindley et al. |
| 8,589,373 | B2* | 11/2013 | Mayer ............... G06F 17/30864 439/152 |
| 9,113,228 | B2* | 8/2015 | Diaz Perez ............ G06Q 30/02 |
| 2002/0060750 | A1 | 5/2002 | Istvan et al. |
| 2002/0133828 | A1* | 9/2002 | Foster ............... H04N 5/445 725/110 |
| 2002/0175944 | A1 | 11/2002 | Kolde et al. |
| 2003/0229893 | A1 | 12/2003 | Sgaraglino |
| 2003/0229900 | A1* | 12/2003 | Reisman ........... G06F 17/30873 725/87 |
| 2004/0126095 | A1 | 7/2004 | Tsumagari et al. |
| 2004/0136698 | A1 | 7/2004 | Mock |
| 2005/0066350 | A1* | 3/2005 | Meuleman ......... H04N 7/17318 725/10 |
| 2005/0160458 | A1 | 7/2005 | Baumgartner |
| 2005/0198315 | A1 | 9/2005 | Wesley et al. |
| 2007/0162502 | A1* | 7/2007 | Thomas .............. G06F 17/3082 |
| 2007/0199039 | A1* | 8/2007 | Diroo ............... H04N 21/42669 725/134 |
| 2007/0204311 | A1* | 8/2007 | Hasek ................ H04N 7/17318 725/91 |
| 2007/0204314 | A1* | 8/2007 | Hasek ................ H04N 7/17309 725/100 |

FOREIGN PATENT DOCUMENTS

| | | |
|---|---|---|
| JP | 2005-165454 | 6/2005 |
| WO | WO 99/01984 | 1/1999 |
| WO | WO 01/20917 | 3/2001 |
| WO | WO 01/93161 | 12/2001 |
| WO | WO 01/95586 | 12/2001 |
| WO | WO 02/31731 | 4/2002 |
| WO | WO 02/084910 A1 | 10/2002 |
| WO | WO 02/095558 | 11/2002 |
| WO | WO 2005/022891 | 3/2005 |
| WO | WO 2006/024992 | 3/2006 |

* cited by examiner

VIDEO-ON-DEMAND SYSTEM

CROSS-REFERENCE TO RELATED APPLICATIONS

This application is a continuation of U.S. application Ser. No. 12/303,663 filed Oct. 4, 2010, the entire content of which is incorporated herein by reference. U.S. application Ser. No. 12/303,663 is a National Phase of PCT/EP07/05014 filed Jun. 6, 2007, and claims priority to European Application No. 06252937.5 filed Jun. 7, 2006.

The present invention relates to a video-on-demand system and methods relating to it.

For some time, there has been a recognition of the desire to be able to provide to a large number of remote users the choice of receiving any of a large number of video programmes as and when desired. With improvements in compression and increased availability of large-bandwidth communications networks, such systems have become more practical.

Near video-on-demand systems have been available in which each video programme is repeatedly broadcast throughout the day at a number of closely spaced times, thereby allowing users to watch those programmes at almost any time. It is also known to make available over the internet video programmes for streaming or download to personal computers connected to the internet. Generally, these systems can be cumbersome to operate and can have limited functionality. The steps required for a user to make a connection or to arrange a subscription with a service provider may be inconvenient.

It is an object of the present invention to provide improved features for a video-on-demand system.

The present application also recognises for the first time the possibility and advantages of using a simple optical disk player as a means for accessing a video-on-demand system without the need of a hard-drive memory. It also recognises for the first time the possibility of providing personal recommendations of video-on-demand programmes based on profiles stored centrally and remotely from user terminals. Furthermore, it recognises for the first time the possibility of providing video-on-demand in pages having a layered structure and allowing functional and advertising overlays to be provided in layers other than that in which the video streaming occurs.

According to the present invention there is provided a method of operating an optical disk player as a video-on-demand player without the need of a hard-drive memory, the optical disk player having an optical disk reader, a processor, a RAM and a port allowing connection to the internet, the method including:

providing a unique identifier on an optical disk;

providing code components on the optical disk which can be run directly from the optical disk on only the processor and RAM of the optical disk player so as to cause the optical disk player to send the unique identifier over the internet to a video streaming service, to operate as a web browser for accessing pages of the video streaming service over the internet and to operate as a video decoder for decoding streamed video data received from pages of the video streaming service wherein the video streaming service can monitor use by a user with reference to the unique identifier.

According to the present invention, there is also provided an optical disk for operating an optical disk player as a video-on-demand player without the need of a hard-drive memory, the optical disk player having an optical disk reader, a processor, a RAM and a port allowing connection to the internet, the optical disk having recorded thereon:

a unique identifier; and code components which can be run directly from the optical disk on only the processor and RAM of the optical disk player so as to cause the optical disk player to send the unique identifier over the internet to a video streaming service, to operate as a web browser for accessing pages of the video streaming service over the internet and to operate as a video decoder for decoding streamed video data received from pages of the video streaming service wherein the unique identifier allows the video streaming service to monitor use by a user with reference to the unique identifier.

In this way, there may be provided a video-on-demand system including such an optical disk and also at least one optical disk player for use in combination with the optical disk as a video-on-demand player, the optical disk player including an optical disk reader, a processor, a RAM and a port allowing connection to the internet; and a video streaming service remote from the optical disk player including at least one server for providing, as pages available over the internet, streams of video data.

In this way, it is not necessary for terminal devices to have hard-drive memories in order to access the video-on-demand service. Flexibility is allowed for a user in choosing which devices are used to connect to a video-on-demand service. Devices without hard disks can be produced more cheaply. Also, there is a general reluctance by consumers to have PC-based systems placed in proximity to large display screens in living rooms due to the sometimes intrusive sound made by fans to cool the circuitry of the PC.

Optical disks can be sold including the browser and video decoder required for the terminal, in the form of an optical disk player, to have access to the video-on-demand service. Furthermore, by providing the unique identifier, the video streaming service is able to identify and/or authenticate the disk so as to establish that it corresponds to a genuine user. It is only necessary for a user to purchase an appropriate disk for that user to be given easy and immediate access to the video streaming service. Furthermore, by way of the unique identifier, the video streaming service can maintain a profile history related to that unique identifier and provide personal recommendations to a user of that unique identifier. Furthermore, it is possible to maintain anonymity of the user with regard to the profile history, since it need only be kept in conjunction with the unique identifier itself.

Preferably, the video streaming service includes a controller responsive to a request from the optical disk player to provide selective access to a plurality of video-on-demand programmes and stream a selected one of the plurality of video-on-demand programmes through an internet page.

Hence, receipt of a streamed video-on-demand programmes is possible merely using the browser and video decoder of the disk in the optical disk player.

Preferably, the controller is arranged to provide through an internet page a menu of available video-on-demand programmes.

Thus, again, a user is able to view and select from a plurality of video-on-demand programmes by means only of the code components provided on the optical disk and any menu information provided over the internet.

Preferably, the video-on-demand system further includes a profile memory remote from the optical disk player in which records of the video-on-demand programmes selected by the user of the optical disk player are stored; and a matcher remote from the optical disk player for comparing the contents of video-on-demand programmes recorded in the profile memory with the contents of video-on-demand programmes available for streaming by the video streaming service and for outputting recommendations of video-on-demand programmes having contents similar to the video-on-demand programmes recorded in the profile memory.

In this way, profile histories for a plurality of different users having respective unique identifiers can be stored centrally and remote from the respective optical disk players. A separate matcher can be provided for analysing the content of the video-on-demand programmes noted in the profile for a particular unique identifier and for comparing this with the contents of the video-on-demand programmes available for streaming. By providing the profile memories remote from the optical disk players and available to the matcher, the matcher having access to the video-on-demand programmes available for streaming, detailed and accurate comparison can be conducted so as to provide good and useful recommendations to the users having respective unique identifiers.

Preferably, the controller is arranged to display on said menu details of video-on-demand programmes recommended by said recommender.

In this way, a user can effectively be provided with an indication of video-on-demand programmes that are likely to be of interest to him or her. Since this recommendation need not be based on any current choice of video-on-demand programme and is a personal recommendation rather than a contextual recommendation, the recommendation can be displayed even when the user is only viewing the general menu with the full choice of available video-on-demand programmes.

Preferably, the records of the video-on-demand programmes selected by the user are stored in conjunction with the unique identifier of the disk used by the user.

In this way, as discussed above, individual profile histories can be matched to users by means of the unique identifiers.

Preferably, the video-on-demand system further includes an account memory remote from the optical disk player for recording account information in conjunction with the unique identifier of the disk used by the user.

This allows the video-on-demand system to keep a record of the financial relationship with individual respective users, for instance by means of notional tokens, which can be assigned in varying amounts to the streaming of various video-on-demand programmes.

According to the present invention, there is also provided a method of providing a user with selective access to a plurality of video-on-demand programmes having respective contents, the method including:

according to selection by the user, streaming one of the plurality of video-on-demand programmes through an internet page including a first layer and a second layer;

providing the video-on-demand stream in the first layer;

providing an overlay image in the second layer which can be selectively combined with the video-on-demand of the first layer;

providing a link in association with the overlay image, selection of the link causing advertising content to be provided to the user;

monitoring selection by the user with regard to content of selected video-on-demand programmes;

judging content of video-on-demand programmes selected by the user; and choosing one of a plurality of overlay images and associated links for provision in the second layer according to the step of judging.

According to the present invention, there is also provided a video-on-demand system accessible over the internet, the system including:

a video server storing a plurality of video-on-demand programmes having respective contents;

a controller responsive to a request from a user to provide selective access to the plurality of video-on-demand programmes and to stream a selected one of the plurality of video-on-demand programmes through an internet page including a first layer and a second layer wherein the controller is arranged:

to stream the selected video-on-demand programmes in the first layer;

to provide, in the second layer, an overlay image which can be selectively combined with the video-on-demand of the first layer;

to provide a link in association with the overlay image, selection of the link causing advertising content to be provided to the user;

to monitor selection by the user with regard to content of selected video-on-demand programmes; and to judge the content of video-on-demand programmes selected by the user; wherein the system further comprises a memory storing a plurality of overlay images, together with respective links and advertising content; and the controller is arranged to select one of the plurality of overlay images and associated links for provision in the second layer according to the judgement of the content of video-on-demand programme selected by the user.

In this way, advertising content can be provided to a user in a way that is tailored to an individual respective user. According to judgement of the video-on-demand programmes watched by a user, the controller can judge appropriate advertising content. This can be made available to the user merely by providing the associated overlay images and links in the second layer of the page being accessed by the user. There is no need at the video server and controller end to adapt the stream of video data provided in the first layer, since the personalised advertising content is made accessible to the user by a second layer, even though this is within the same page. This aspect of the invention is independent of the aspect above relating to a user not needing a hard-drive and is applicable to arrangements where a hard-drive is used as well as to those where a hard-drive is not used.

The controller can be arranged to select said one of the overlay images for the second layer based at least partly on the content of the video-on-demand being at that time streamed to the first layer.

In this way, advertising content can be chosen for a user on the basis of a contextual recommendation. In other words, the system will recommend and provide advertising content that relates to the video-on-demand programme being streamed at the same time as the overlay images for the advertising content are to be displayed.

It is also possible to provide overlay images that are based on personal recommendation. In this respect, the video-on-demand system can further include a profile memory in which records of the video-on-demand programmes selected by the user are stored;

a matcher for comparing the contents of video-on-demand programmes recorded in the profile memory with the advertising contents associated with respective overlay images and outputting a recommendation of an overlay image for display;

wherein, the controller is arranged to select said one of the overlay images for the second layer based at least partly on the recommendation from the matcher.

Thus, irrespective of the video-on-demand programme being watched at the time, the system is able to choose advertising content that is likely to be of interest to the user based on the history profile for that user.

The link provided by the video-on-demand system can be the address of a different internet page, the controller providing the advertising content in that different internet page.

Alternatively, selection of the link can cause the controller to provide the advertising content in the second layer. In this case, it is possible for the video-on-demand programme to be continued to be streamed. Of course, where the system takes a user to advertising content of a different internet page, it is also possible for the system to remember, for instance by means of a timestamp, the position to which the user had progressed in the video-on-demand programme and, hence, after viewing the advertising content, return to the video-on-demand programme at the right place.

Preferably, the controller is responsive to selection by the user to cause display of only the first layer or the first layer in combination with the second layer.

In this way, the user is able to view a streamed video-on-demand programme with or without the overlay images of possible advertising content. In one embodiment, it is possible to provide the user with the option of being charged less, for instance in notional tokens, for watching a video-on-demand programme with the overlay images of the second layer on display.

According to the present invention, there is also provided a method of transmitting video-on-demand including:

streaming, from a server on the internet, video-on-demand through an internet page including a first layer and a second layer;

providing the video-on-demand stream in the first layer;

providing, in the second layer, for selective combination with the video-on-demand of the first layer, a plurality of overlay images corresponding to respective control functions of the video-on-demand stream;

enabling a user at a remote location on the internet to select respective overlay images when the plurality of overlay images are displayed in combination with the video-on-demand at the remote location; and responding at the server to selection of an overlay image at the remote location so as to change the video-on-demand stream in accordance with the corresponding respective control function.

According to the present invention, there is also provided a video-on-demand system accessible over the internet, the system including:

a video server storing video-on-demand content and for streaming video-on-demand through a first layer of an internet page having a first layer and a second layer; and a controller for causing there to be formed in the second layer a plurality of selectable overlay images such that a user at a location on the internet remote from the video server and the controller can display streamed video-on-demand of the first layer in combination with the overlay images of the second layer and can select one of the overlay images; wherein the overlay images correspond to respective control functions for the video-on-demand stream; and the controller is responsive to selection of an overlay image to change the video-on-demand stream in accordance with the corresponding respective control function.

This provides an effective way of allowing control functions for the video-on-demand stream to be made available to the user without the user needing a hard-drive memory or any sophisticated processing. However, this aspect of the invention is independent of the aspects above relating to a user not needing a hard-drive and is applicable to arrangements where a hard-drive is used. The user always receives nothing more than appropriately streamed video data even though the system gives the appearance and feel that functions are occurring at the user end. When a particular overlay image and function is selected at the user end, it is the controller at the video-server end that responds by changing the streamed video data accordingly. With the overlay images already present, but in the second layer of the page, the user terminal need only switch between displaying and not displaying the second layer so as to give the user the feel of enabling or disabling the respective functions. Furthermore, changing the display in this way need not change how the controller streams the video-on-demand.

It is possible that the controller is arranged to provide the overlay images in the internet page in a form for storage by the user in a cache and to control display of the overlay images in combination with the video-on-demand stream.

This allows greater efficiency in use of bandwidth.

Preferably, the controller is arranged to provide alternative overlay images for storage simultaneously in the cache with the overlay images such that, when an overlay image is selected, the controller causes display of the selected overlay image to be replaced by display of the corresponding alternative overlay image.

In this way, the alternative overlay images can be used as feedback to the user and to provide highlighting of overlay images to enable the user to understand which corresponding function is to be selected. With the overlay images and alternative overlay images being stored in cache locally at the user end, scrolling through the various overlay images can be achieved without communication with the controller and with the resulting benefits of avoiding unnecessary use of bandwidth.

It will be appreciated that a similar arrangement is possible with the overlay images discussed above for advertising content.

Preferably, the controller is responsive to selection by the user to cause display of only the first layer or the first layer in combination with the second layer.

In this way, a user is able to view only the video-on-demand programmes by means of the first layer and, when desired, can cause the second layer to be displayed in combination with the first layer, thereby allowing access to the various control functions.

Preferably, the controller is arranged to cause the plurality of overlay images to be displayed together as a function bar. The plurality of overlay images can include one or more respective overlay images corresponding to functions of stopping, playing, pausing, rewinding and fast forwarding the video-on-demand stream appearing in the first layer.

Preferably, the video server stores a plurality of video-on-demand programmes having respective contents;

the controller is responsive to a request from the user to provide selective access to the plurality of video-on-demand programmes;

the controller is arranged to judge the content of the video-on-demand programme selected by the user;

for at least one control function, there are a plurality of different overlay images relating to different types of video-on-demand content; and the controller is arranged to select an appropriate one of the plurality of different overlay images for provision in the second layer according to the judgement of the content of the video-on-demand programme selected by the user.

In this way, it is possible to provide overlay images that have an appearance relevant to the content of the video-on-demand programme being streamed in the first layer.

The invention will be more clearly understood from the following description, given by way of example only, with reference to the accompanying drawings in which.

Figure 1:
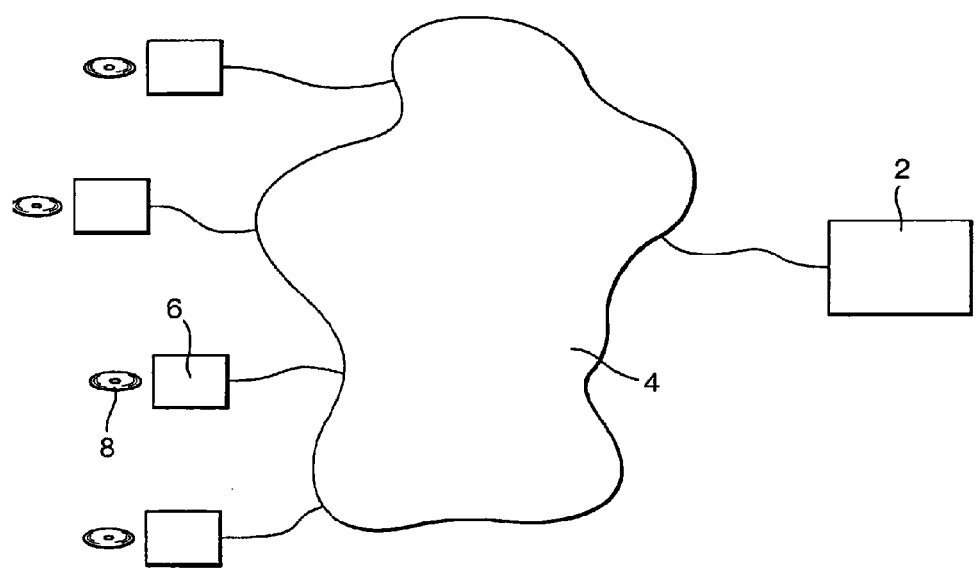
FIG. 1 illustrates schematically an overall system embodying the present invention.

The present application relates to video streaming over a network such as is illustrated in FIG. 1.

A video streaming service 2 is configured for connection to the internet 4. A plurality of users are provided with respective terminals 6, each of which is also configured for connection to the internet 4. It will be appreciated that, while the video streaming service 2 and terminals 6 are configured for connection to the internet 4, it is also possible for them to be connected to other networks allowing video data to be streamed from the video streaming service 2 over the network to individual terminals 6.

According to one important aspect of the present invention, in order to enable a terminal 6 to be used as a video-on-demand player, each respective user is provided with a disk 8 which, when loaded in the terminal 6, allows that terminal to operate as a video-on-demand player. It will be appreciated that the terminals 6 are also provided with display monitors of any form suitable for displaying received video-on-demand programmes.

Figure 2:
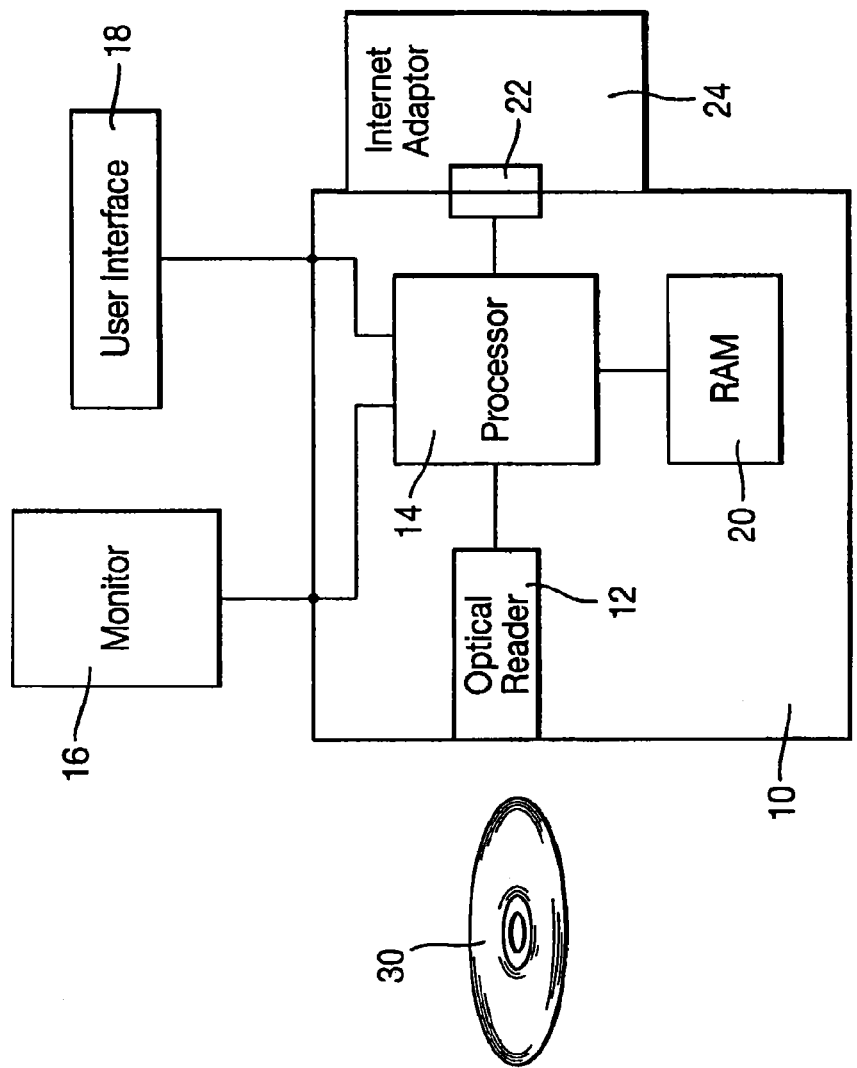
FIG. 2 illustrates one of the terminals of FIG. 1 embodying the present invention.

FIG. 2 illustrates schematically a typical terminal 6 suitable for use in the arrangement of FIG. 1.

An optical disk player is provided with an optical disk drive or optical disk receiver 12. The optical disk player includes a processor 14 which is capable of reading information from the optical disk receiver 12, carrying out various functions on the basis of data from the optical disk receiver 12 and displaying any images on a monitor 16. A user interface 18 may be connected to the optical disk player 10 in order to allow a user to control the optical disk player 10.

As illustrated, the optical disk player 10 may also be provided with a Random Access Memory (RAM) 20. This is merely for use in a well-known manner for enabling the processor to conduct any processes as required for correct functioning of the optical disk player 10. Importantly, in consideration of the present invention, it is not necessary for the optical disk player 10 to have any hard-drive memory. An optical disk 30 is inserted into the optical reader 12 of the optical disk player 10 by a user and the processor 14 is able to carry out any required processes, for instance as instructed by the user interface 18, directly from data recorded on the optical disk 30 without the need first to transfer large sections of data or indeed complete executable programs to a hard-drive memory.

A typical optical disk player suited for the functioning of the optical disk player 10 would be a gaming console, for instance consoles from Sony's PlayStation (trade mark) series. Consoles or other devices having in-built or interconnected hard disk devices or other mass storage memory devices (such as semi-conductor memory) are not precluded from use within the system of the present invention.

As illustrated, the optical disk player 10 is also provided with a port 22 allowing connection to the internet. In some embodiments, the port itself may include the necessary interfaces for connection directly to a telecommunications line providing internet access. However, in the illustrated embodiment, the port 22 connects to an internet adaptor 24. The internet adaptor 24 contains all necessary interfaces and can be connected to a telecommunications line providing internet connectivity.

Figure 3:
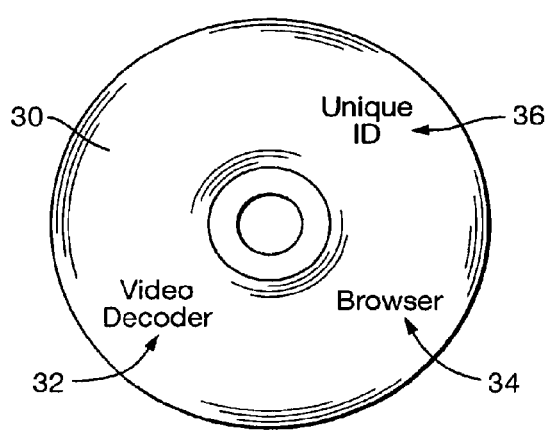
FIG. 3 illustrates schematically a disk for use in the present invention.

FIG. 3 illustrates schematically an optical disk for use with the optical disk player of FIG. 2.

The optical disk 30 includes, as part of its structure, code components constituting a video decoder 32 and also code components constituting a web browser 34. Importantly, both the video decoder and the browser are executable directly from the disk 30 and, unlike prior-art disks, do not come with installation routines for causing their installation onto the hard-drive memory of the machine in which they are loaded. The video decoder 32 is of any suitable form for decoding streamed video data as received from the video streaming service 2. This includes MPEG2 or MPEG4 decoders or decoders of any other suitable standard whether proprietary or not. The web browser 34 can be a generally conventional web browser, but is stored in conjunction with the address or URL of the main portal (like a home page) of the video streaming service 2. More preferably, the browser is accompanied by or includes some custom features which, as will be described below, allow identification and/or authentication of the optical disk 30 and its user.

In practice, a user purchases an optical disk 30 for use with his or her optical disk player 10. Where the optical disk player 10 is a games console, the optical disk 30 can be sold alongside other optical disks which enable the optical disk player 10 to function as respective video games, the games enabling user control from the user interface 18 and display of images on the monitor 16.

Leaving aside the authentication steps to be discussed below, with the optical disk 30 loaded in the optical reader 12 of the optical disk player 10, the processor 14 causes the browser 34 of the optical disk 30 to run and operate. As mentioned above, the optical disk 30 includes the address or URL of the main portal or homepage on the interne to the video streaming service 2. Hence, the browser 34 immediately and automatically causes the optical disk player 10 to access the main portal of the video streaming service 2. From this point onwards, the optical disk player 10 works as an internet browser, receiving image data from the video streaming service 2, for instance in the form of HTML pages, with appropriate selection being made by the user using the user interface 18. Selection and interaction with the video streaming service 2 may take the form of selection of various regions of a displayed page and, for instance using HTML, transfer of the browser to a different URL on the basis of a link provided in conjunction with that region of the image.

Where the optical disk player 10 takes the form of a games console, the user interface 18 can be the associated games handset, possibly of conventional form. In addition to up, down, left, right, enter/OK, functions may be assigned to other keys such as those represented by "X", "O", triangle or square on a PlayStation™ controller.

Using the user interface 18 and browser 34, a user can navigate to a part of the video streaming service 2 that streams a video-on-demand programme according to the choice of that user. The streamed video data will be received by the optical disk player 10 as part of an internet page. In a well-known manner, the browser 34 can then make use of the video decoder 32 to decode that video data stream and provide appropriate video images for output to the monitor 16. However, unlike prior-art arrangements, the video decoder 32 is executed directly from the optical disk 30 and not from any hard-disk memory forming part of the optical disk player 10.

As mentioned above, the system can include an identification/authentication process for the optical disk 30. In its most basic form, this process can merely identify the optical disk 30 and allow the video streaming service 2 to keep a record of video-on-demand programmes accessed by a user with the use of that particular optical disk 30. However, in conjunction with that operation, the video streaming service 2 can actually perform some form of check or authentication to ensure that the optical disk 30 is a valid optical disk as endorsed by the video streaming service 2.

In one embodiment, when the optical disk 30 is loaded in the optical disk reader 12 of the optical disk player 10, the browser 34 takes the optical disk player 10 to a page at which the video streaming service 2 sends the optical disk player 10 data causing the optical disk player 10 to display on the monitor 16 a request for entry of a unique identifier, for instance of the form of an alphanumeric sequence. Perhaps when purchasing the optical disk 30 or by contacting the video streaming service 2, the user of the optical disk 30 has been provided with the unique identifier. By entering that unique identifier, such that it is transmitted to the video streaming service 2, the video streaming service 2 can recognise the user and permit the browser 34 of the optical disk player 10 to access other pages available from the video streaming service 2.

In an alternative embodiment, as illustrated schematically in FIG. 3, the unique identifier 36 is provided as data on the optical disk 30 itself. In this case, the browser 34 includes or is accompanied by some custom code or routine such that, when it first connects with the main portal or opening page provided by the video streaming service 2 and the video streaming service 2 requests notification of the unique identifier, the custom code or routine automatically retrieves the unique identifier 36 present on the optical disk 30 and provides this to the video streaming service 2. In this way, no user intervention is required and loading of the optical disk 30 in the optical disk player 10 is sufficient for the user to gain access to the video streaming service 2.

In some embodiments, different unique identifiers can be associated with different levels of service to be provided by the video streaming service 2. In other words, certain unique identifiers will allow access to pages within the video streaming service 2 which other unique identifiers will not.

In some embodiments, the video streaming service 2 may require the user to be using an authorised optical disk player 10. In this case, the initial authentication process may additionally require the video streaming service 2 to be provided with a unique device identifier of the optical disk player 10 itself. This could be entered manually by the user using the user interface 18 or, again, the browser 34 may be accompanied by a special custom code or routine which causes that device identifier to be returned to the video streaming service 2 automatically upon request.

At this point, it is worth noting that a similar authentication process could be used even to allow the optical disk 30 and optical disk player 10 to be used with internet connectivity and before the browser 34 of the optical disk player 10 even connects with the main portal of the video streaming service 2.

Figure 4:
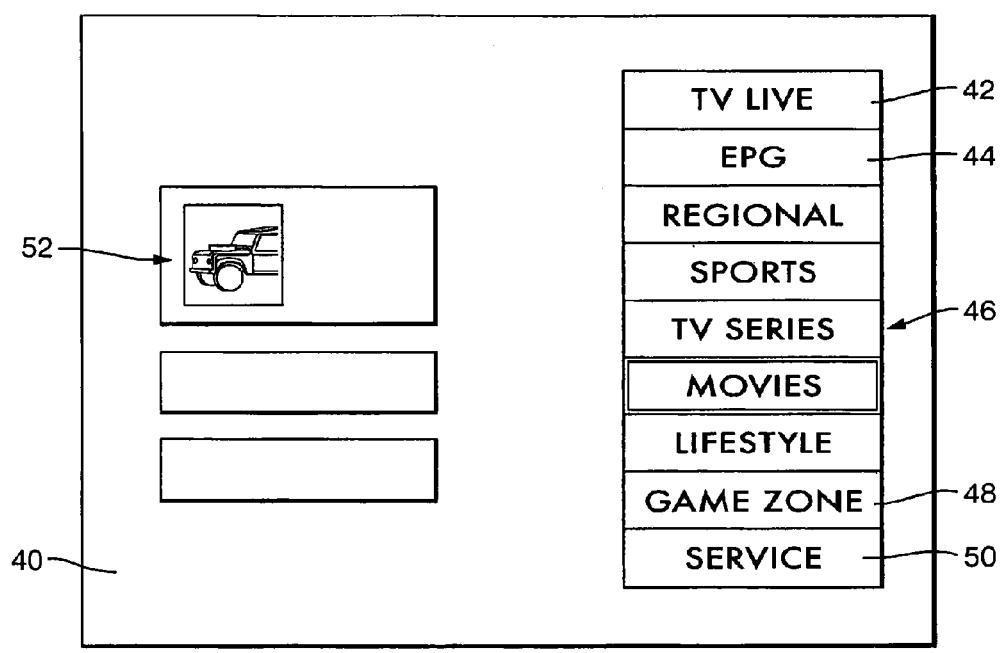
FIG. 4 illustrates schematically a main menu to be presented to the user in an embodiment of the present invention.

FIG. 4 illustrates schematically a possible main menu to be provided by the video streaming service 2 to the optical disk player 10 for display on the monitor 16.

On the right of the page 40, there is displayed a list of possible options. A user, using the user interface 18, is able to scroll through and select these various options.

As illustrated, there is a linear live TV stream 42 available and also an electronic programme guide 44. In this regard, it is considered most likely that only a limited amount of linear live TV would be available and the electronic programme guide would merely provide guidance to the user as to what is available as linear live TV, for instance using some other TV receiver. However, as will be discussed further below, the video streaming service 2 is preferably able to analyse content of programmes. In this regard, the electronic programme guide 44, if selected, could provide contextual recommendations to the user of similar programmes available as video-on-demand programmes or indeed indicate where that same programme is already available as a video-on-demand programme.

The page 40 also lists a series of categories of video-on-demand programmes 46 to be discussed below.

By way of example, the page 40 illustrates a selectable option which takes the user to a section allowing the purchasing of goods, for instance downloadable games in the case illustrated.

Finally, the service option 50 may be a customer service page enabling a user to get ✱Help✱, find ✱FAQs✱, contact Customer Support or purchase tokens.

On the left of the displayed page 40, in this preferred embodiment, personalised recommendations 52 of other video-on-demand programmes are shown. This will be discussed further below.

FIG. 5 illustrates, again schematically and by way of example, a page where a user has selected a particular category of video-on-demand 46 as illustrated in the display page 40. This display page 60 includes on the right a list of video-on-demand programmes 62 through which a user may scroll using the user interface 18. Each item of the list 62 could include a very brief summary, perhaps only the title, together with a representative image. It might also include, as a contextual recommendation, details or a link to another video-on-demand programme of similar or related content.

On the left of the display page 60, there is displayed a control bar 64, which is active for the currently selected video-on-demand programme of the list 62. The control bar 64 includes a plurality of selectable functions through which the user may scroll using the user interface 18. Where there are too many functions to be displayed conveniently, the page can be arranged to scroll through all of the available functions and display only a limited number at any one time. The video-on-demand programmes listed as items of the list 62 can similarly be scrolled through with only a limited number being displayed at any one time.

As illustrated, the control bar 64 includes a symbol 66 for play of a selected video-on-demand programme and a symbol 68 linking the browser 34 of the optical disk player 10 to another page providing additional information about the selected video-on-demand programme. The control bar 64 may also include information 70 relating to the cost to the user of receiving the currently highlighted video-on-demand programme. This will be discussed further below, but as illustrated is represented as a cost in notional tokens.

A similar display could be used as a page for providing shopping where the control bar includes a selectable function of purchasing a selected item in a list.

Figure 5:
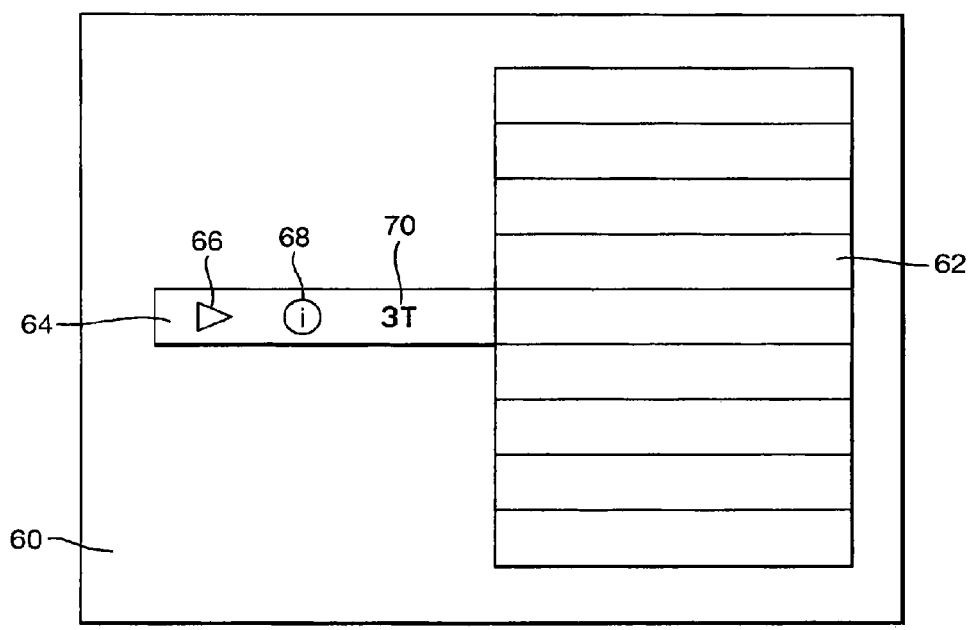
FIG. 5 illustrates a video-on-demand programme menu for presentation to a user according to an embodiment of the present invention.
Figure 6:
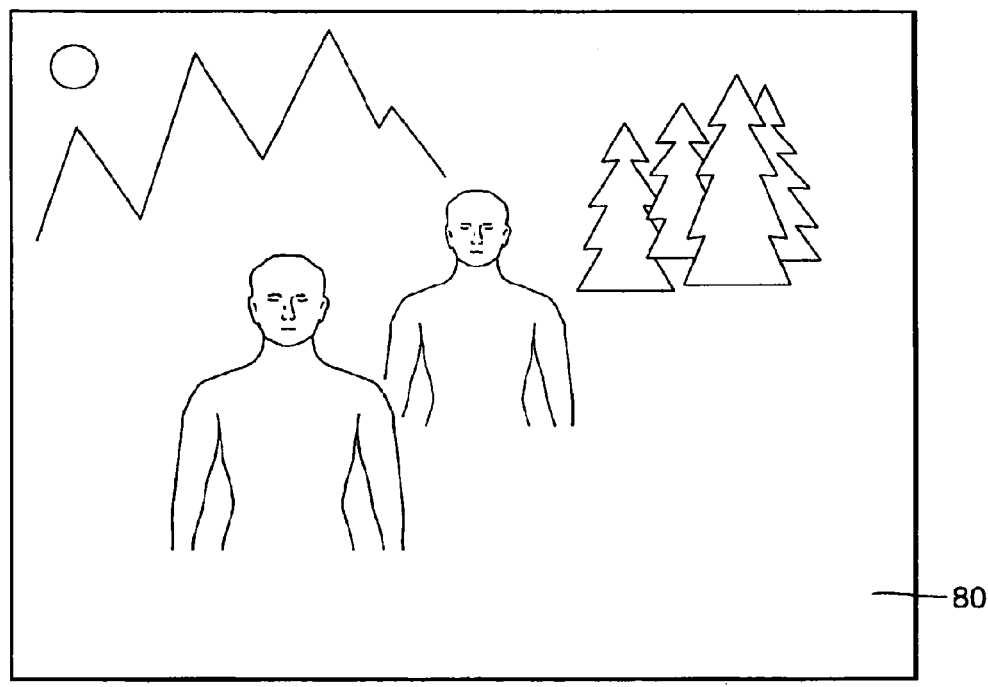
FIG. 6 illustrates schematically a page of video streaming provided according to the present invention.

Moving from the display page 60 of FIG. 5, if a user selects the play function 66 for a video-on-demand programme, the browser 34 of the optical disk player 10 is redirected to a page 80 as illustrated schematically in FIG. 6 within which the video data of the selected video-on-demand programme is streamed. As mentioned above, the browser 34 of the optical disk player 10 makes use of the decoder 32 and, hence, the requested video-on-demand programme is displayed on the monitor 16.

The internet page 80 may not be provided as only one layer, but can be provided as two or more layers which are all received as part of the page 80 by the optical disk player 10, but are displayed selectively according to a request from the user. For instance, a predetermined button on the user interface 18 may be pre-assigned to make this selection.

Figure 7:
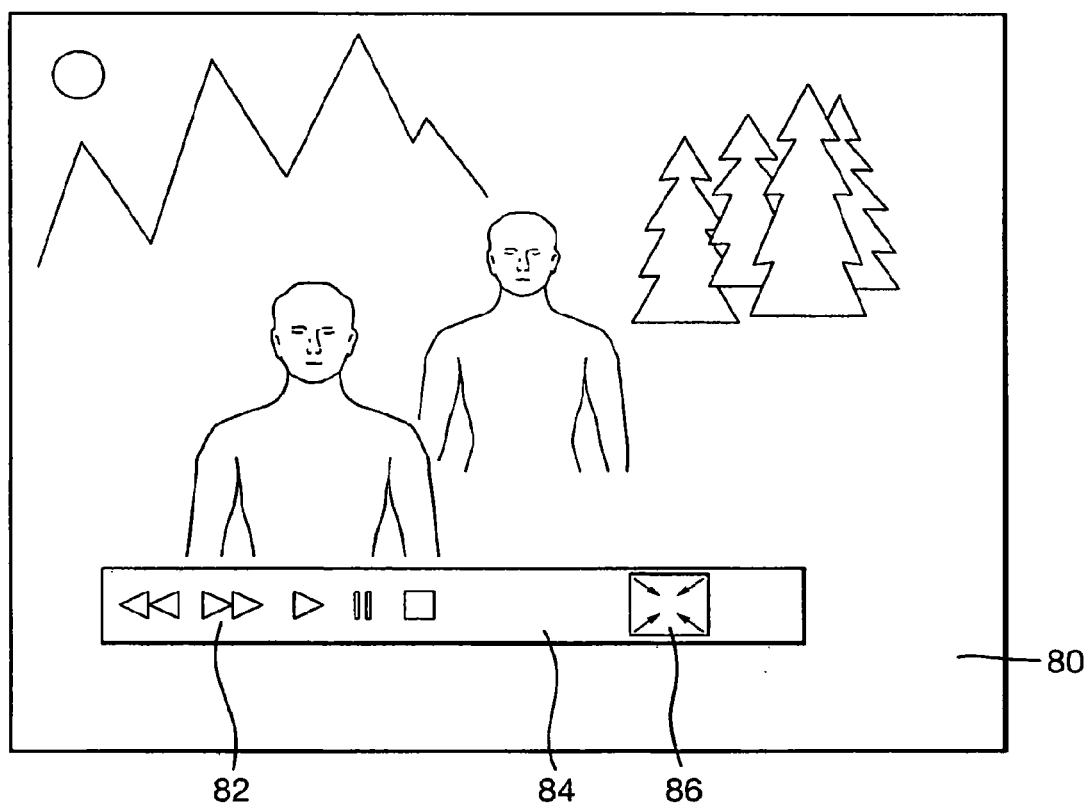
FIG. 7 illustrates schematically functional overlay images for use with the present invention.

FIG. 7 illustrates an example where a second layer containing a plurality of overlay images 82 arranged as a function bar 84 are displayed in conjunction with the first layer carrying the video-on-demand programme. As illustrated, respective overlay images 82 are provided for rewind, fast-forward, play, pause and stop functions. Using the user interface 18, a user may scroll through the various overlay images and select one of the images and its corresponding function. The video streaming service 2 is responsive to this selection in the second layer of the page 80 to carry out the required function. In other words, the video data being streamed in the first layer of the page 80 gives the appearance of the video-on-demand programme being fast rewound, fast-forwarded, played, paused or stopped. It will be appreciated that, although the user has the feeling that the functions are being carried out locally, it is in fact the video streaming server 2 that is providing a different stream of video data.

The actual overlay images themselves can be transferred from the video streaming service 2 for storage locally in cache at the optical disk player 10. For instance the RAM 20 can be used.

For each function, alternative overlay images can be held in cache. In particular, in some embodiments, each function can have an overlay image having a normal appearance and an overlay image having a highlighted appearance such that when a user scrolls through the various overlay images, the position to which the user has scrolled is indicated by an overlay image having a highlighted appearance. It is possible also for a third alternative appearance to be stored and then displayed when a user actually selects the function corresponding to that image.

It is also possible for the video streaming service 2 to provide a plurality of different versions of overlay image for each corresponding function. Indeed, a plurality of different sets of overlay images can be provided for different versions of function bar 84. The video streaming service 2 is then arranged to provide in the second layer a set of overlay images 82 appropriate to the content of the video-on-demand programme being streamed in the first layer of that page. Thus, in contrast to the example illustrated in FIG. 7, if the video-on-demand programme being streamed in the first layer of the page is a football match, then the overlay images could have a football theme, for instance a player running forwards to signify fast forwards and a goalkeeper catching a football to signify stop. In other words, the appearance of the overlay images provided in the second layer of a page are matched contextually to the content of the video stream in the first layer of that page.

In one preferred embodiment, as illustrated in FIG. 7, an overlay image 86 may be provided corresponding to a minimising function for reducing the size of the streamed video-on-demand programme. In particular, upon selecting the function of this overlay image, the first layer can be replaced by a relatively small window in which the video-on-demand programme continues to be streamed, leaving the remainder of the area of the display to show other information, for instance information regarding the video-on-demand programme.

Figure 8:
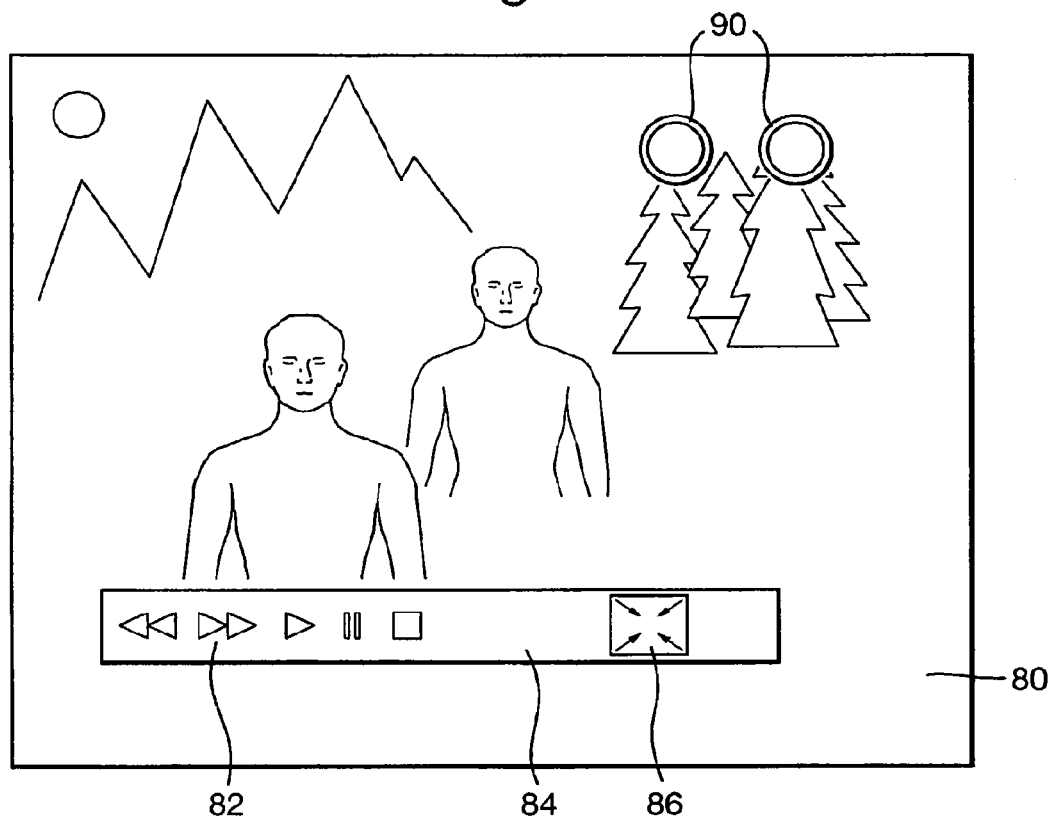
FIG. 8 illustrates schematically advertising-content overlay images for use with the present invention.

As illustrated in FIG. 8, it is possible to provide other overlay images 90. These may be provided in the second layer of the page 80 or, indeed, in other layers of the page 80. It is proposed that each of these overlay images 90 relates to respective advertising content available to the user. Using the user interface 18, a user may select a particular overlay image 90. Each overlay image 90 has associated with it a link to associated advertising content. For instance, the link could take the form of a URL address redirecting the browser 34 of the optical disk player 10 to a different page showing the associated advertising content. That advertising content could be text, images or streamed video in the same manner as discussed above. Advertising content may for example be related to products or services or other video material available over the video-on-demand service. Alternatively, the link could change the content of a layer of the page or bring an additional layer into view. In one embodiment, the video-on-demand programme currently being streamed could be moved to a small window as described above with the advertising content being displayed in other parts of the full display.

Figure 9:
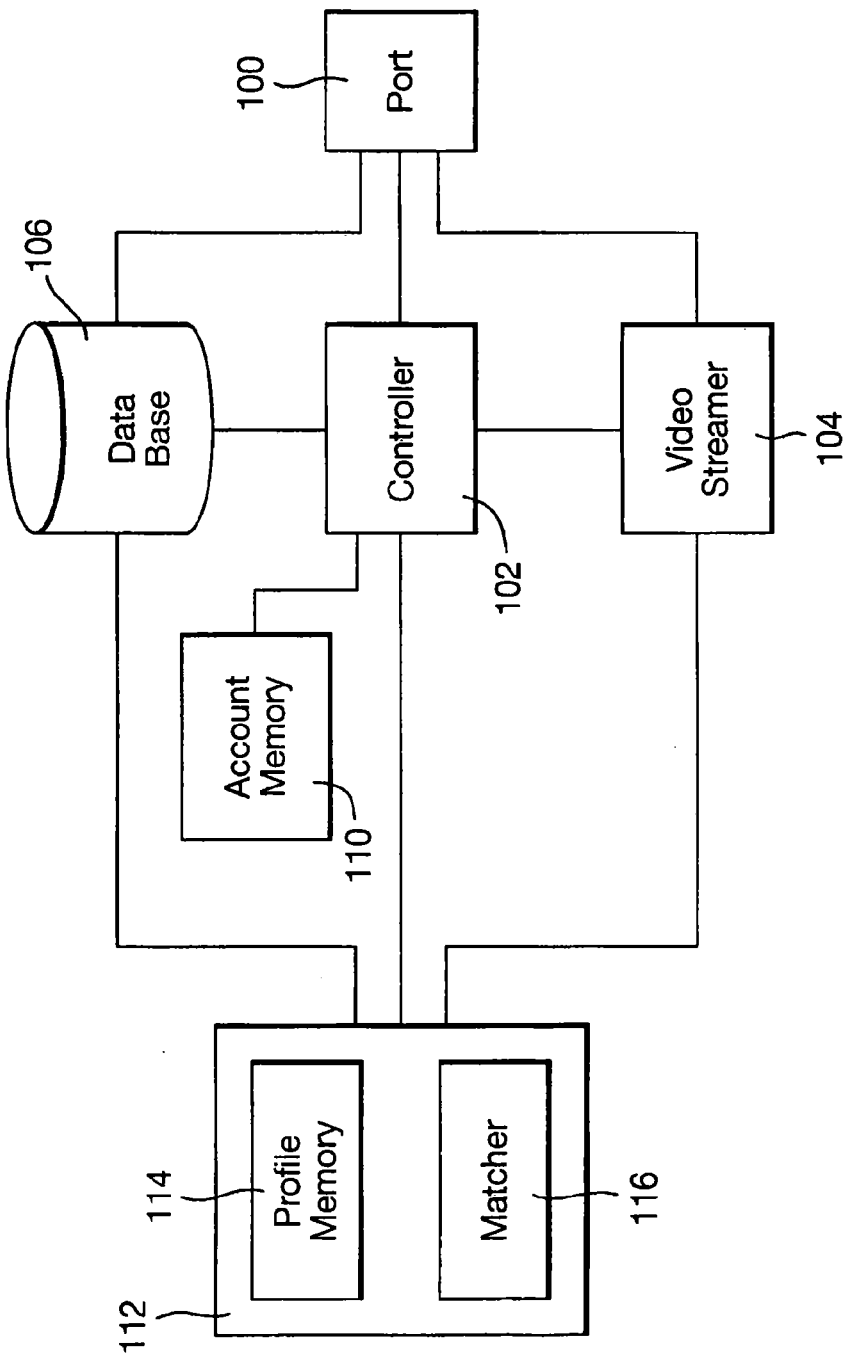
FIG. 9 illustrates schematically a video streaming server for use with the present invention.

Turning now to FIG. 9, there is illustrated a schematic representation of the video streaming service 2.

A connection 100 provides connectivity to the internet and allows terminals 6, including optical disk players 10, to access the portal and pages of the video streaming service 2.

As illustrated, a controller 102 has access to and control of a video streamer 104 and a database 106. By means of previously stored data and information received from external sources, the controller 102 is able to provide the pages and layers discussed above. In conjunction with this, the video streamer can provide streams of video data corresponding to video-on-demand programmes selected by users at terminals 6.

FIG. 9 illustrates schematically the fact that the video streaming service 2 includes an account memory 110. In particular, it is proposed that each user identified by the unique identifier 36 discussed above is assigned an account, which is debited according to use of the service. It is proposed that each video-on-demand programme is assigned a notional value, for instance recorded in notional tokens. Whenever a user requests access to a video-on-demand programme, the corresponding number of tokens are debited from the account stored for the corresponding unique identifier in the account memory 110. In one embodiment, the optical disk 30 bought originally by the user is assigned a particular value in terms of tokens. When the user first uses the optical disk 30 and the video streaming service 2 authenticates the optical disk 30 as discussed above, the user is credited that amount to the corresponding account memory. Various systems can be considered for crediting the account memory 110 with more tokens, for instance with credit card transactions over the internet.

As illustrated, the video streaming service 2 is also provided with a recommender 112 comprising a profile memory 114 and separate matcher 116.

The profile memory 114 is arranged to store, in conjunction with the unique identifier, a record of the video-on-demand programmes selected by the user of that unique identifier. In this way, the video streaming service 2 can look at the history of video-on-demand programmes accessed by a particular user and recommend other video-on-demand programmes that the user might enjoy. To do this, the recommender 112 includes a matcher 116, which compares the content of video-on-demand programmes recorded in the profile memory 114 for a particular unique identifier with video-on-demand programmes available from the video streamer 104. As a result of this comparison, the recommender 112 is able to provide the controller 102 with a list of personalised video-on-demand recommendations. Returning to FIG. 4, these can be provided as recommendations 52 on page 40. By storing profiles in the profile memory 114 remote from the terminals 6, it is possible for the matcher 116 to carry out relatively sophisticated comparison of the video-on-demand programmes previously watched by a user and those available. Hence, relatively accurate recommendations may be made to a particular user. Where the recommender 112 is able to provide a very large number of recommendations, in the preferred embodiment, the controller 102 is arranged to display only the most relevant recommendations.

By making use of the unique identifier, it will be appreciated that an individual's personal profile can be kept anonymous. The system need only relate a profile to a unique identifier 36 and it is not necessary that that unique identifier be related to a particular individual.

The recommender 112 can also be used in conjunction with the overlays 90 and advertising content described with reference to FIG. 8.

In the same way as discussed above, the matcher 116 can compare the personal profile associated with a particular unique identifier with advertising content stored either in the database 106 or video streamer 104. As a result, the recommender 112 can recommend to the controller 102 advertising content appropriate to a user having a particular unique identifier. On the basis of this recommendation, the controller 102 can thus cause to be displayed, in a layer of page 80, overlay images 90 with links to advertising content of potential interest to the user. Of course, the controller 102 could also cause to be displayed overlay images 90 with links to advertising content having contextual relevance to the particular video-on-demand programme being streamed at that time. Indeed both the contextual recommendation and the personal recommendation could be taken into account when deciding which overlay images 90 and links to provide in a layer in association with transmission of a video-on-demand programme in a first layer.

Considering again the account memory 110, it is proposed that, in one embodiment, selection by a user of an overlay 90 and the corresponding link to its advertising content could be arranged to result in a credit of some tokens to the user's account. Alternatively, in a menu list such as illustrated in FIG. 5, a user could be given the option of receiving a video-on-demand programme with or without advertising content. In that case, the user would be able to obtain the video-on-demand programme together with advertising content at a lower rate of tokens than without the advertising content.

The invention claimed is:

1. An electronic device comprising:
   an interface configured to receive video-on-demand content via a network;
   a processor configured to decode an internet page via which the video-on-demand content is received, the internet page including the first layer and a second layer and a link, and configured to send user selections via the interface wherein:
   an item of selected video-on-demand content is received in the first layer,
   an overlay image that can be selectively combined with the video-on-demand content of the first layer, is received in the second layer,
   the interface is further configured to receive a link in association with the overlay image, selection of the link causing advertising content to output for display, and wherein
   the user selections form a history profile which determine what overlay images are received in the second layer to the video-on-demand content of the first layer.

2. The electronic device according to claim 1, wherein the link is the address of a different internet page and the interface receives associated with advertising content in the different internet page.

3. The electronic device according to claim 1, wherein selection of the link causes the interface to receive the advertising content in the second layer.

4. The electronic device according to claim 1, wherein selection of the link causes the interface to receive the advertising content in a third layer of the internet page.

5. The electronic device of claim 1, wherein the advertising content is output for display in portion of a display concurrently with the item of video-on-demand content in the first layer.

6. The electronic device according to claim 1, wherein the processor is responsive to selection by the user to output for display only the first layer or the first layer in combination with the second layer.

7. The electronic device according to claim 1, wherein user selections that form a history profile correspond to selections of video-on-demand content by contextual matching.

8. The electronic device according to claim 1, wherein the processor is configured to decode the overlay images in the internet page into a form for storage in memory and to output for display the overlay images in combination with the video-on-demand content.

9. The electronic device according to claim 1, wherein the overlay image received in the second layer relates to advertising content.

10. A method for an electronic device, comprising:
    receiving, via an interface, video-on-demand content via a network;
    decoding, with a processor, an internet page via which the video-on-demand content is received, the internet page including the first layer and a second layer and a link; and
    sending, by the processor, user selections via the interface wherein:
    an item of selected video-on-demand content is received in the first layer, an overlay image that can be selectively combined with the video-on-demand content of the first layer, is received in the second layer, the interface is further configured to receive a link in association with the overlay image, selection of the link causing advertising content to output for display, and wherein the user selections form a history profile which determine what overlay images are received in the second layer to the video-on-demand content of the first layer.

11. A non-transitory computer-readable medium encoded with computer-readable instructions thereon that, when executed by a processor, cause the processor to perform a method comprising:

receiving video-on-demand content via an interface and from a network;

decoding an internet page via which the video-on-demand content is received, the internet page including the first layer and a second layer and a link; and sending user selections via the interface wherein:

an item of selected video-on-demand content is received in the first layer, an overlay image that can be selectively combined with the video-on-demand content of the first layer, is received in the second layer, the interface is further configured to receive a link in association with the overlay image, selection of the link causing advertising content to output for display, and wherein the user selections form a history profile which determine what overlay images are received in the second layer to the video-on-demand content of the first layer.

* * * * *

UNITED STATES PATENT AND TRADEMARK OFFICE
CERTIFICATE OF CORRECTION

PATENT NO. : 9,479,835 B2
APPLICATION NO. : 14/451538
DATED : October 25, 2016
INVENTOR(S) : Martin et al.

Page 1 of 1

It is certified that error appears in the above-identified patent and that said Letters Patent is hereby corrected as shown below:

In the Claims

Column 14, Line 29, Claim 2: change "associated with advertising" to --the associated advertising--.

Signed and Sealed this
Tenth Day of April, 2018

Andrei Iancu
*Director of the United States Patent and Trademark Office*